United States Patent
Yoon et al.

(10) Patent No.: US 12,308,443 B2
(45) Date of Patent: May 20, 2025

(54) METHOD FOR MANUFACTURING CATALYST FOR FUEL CELL NOT POISONED BY IONOMER

(71) Applicants: Hyundai Motor Company, Seoul (KR); Kia Corporation, Seoul (KR)

(72) Inventors: Dong Hwan Yoon, Gyeonggi-do (KR); Seong Min Yuk, Gyeonggi-do (KR); Hoon Hui Lee, Seoul (KR); Jin Seong Choi, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/506,404

(22) Filed: Oct. 20, 2021

(65) Prior Publication Data
US 2022/0200013 A1    Jun. 23, 2022

(30) Foreign Application Priority Data
Dec. 17, 2020   (KR) .................... 10-2020-0177211

(51) Int. Cl.
*H01M 8/00* (2016.01)
*H01M 4/88* (2006.01)

(52) U.S. Cl.
CPC ....... *H01M 4/8828* (2013.01); *H01M 4/8882* (2013.01); *H01M 8/00* (2013.01)

(58) Field of Classification Search
CPC ........ H01M 8/1225; H01M 8/00; H01M 4/00; H01M 4/0471; H01M 4/8828; H01M 4/8882; H01M 4/8892; H01M 4/926; H01M 4/8605; H01M 4/92; C23C 14/0605; C23C 8/44; B22F 2201/30; Y02E 60/50
USPC .............................. 427/249.1, 227, 228, 122
See application file for complete search history.

(56) References Cited

U.S. PATENT DOCUMENTS

| | | | |
|---|---|---|---|
| 2001/0009733 A1* | 7/2001 | Campbell | H01M 4/9083 502/101 |
| 2015/0030966 A1* | 1/2015 | Shimoi | H01M 4/921 429/524 |
| 2018/0166698 A1* | 6/2018 | Kim | H01M 4/8825 |
| 2018/0183083 A1* | 6/2018 | Lee | H01M 4/9083 |
| 2022/0029173 A1* | 1/2022 | He | H01M 4/9008 |

FOREIGN PATENT DOCUMENTS

| | | | |
|---|---|---|---|
| JP | 2013164929 | * | 8/2013 |
| KR | 2018-0076957 A | | 7/2018 |
| KR | 2019-0118355 A | | 10/2019 |
| WO | 2014141732 | * | 9/2014 |

* cited by examiner

*Primary Examiner* — Tabassom Tadayyon Eslami
(74) *Attorney, Agent, or Firm* — Fox Rothschild LLP

(57) ABSTRACT

The present invention provides a method for manufacturing a catalyst for a fuel cell which may not be poisoned by an ionomer. Specifically, the method includes: loading a catalyst on a support, coating a carbon layer having a predetermined thickness on the surface of the support, and exposing the catalyst to the outside by removing at least a part of the carbon layer.

12 Claims, 4 Drawing Sheets

METHOD FOR MANUFACTURING CATALYST FOR FUEL CELL NOT POISONED BY IONOMER

CROSS-REFERENCE TO RELATED APPLICATION

This application claims under 35 U.S.C. § 119(a) the benefit of priority to Korean Patent Application No. 10-2020-0177211 filed on Dec. 17, 2020, the entire contents of which are incorporated herein by reference.

TECHNICAL FIELD

The present invention relates to a method for manufacturing a catalyst for a fuel cell which may not be poisoned by an ionomer.

BACKGROUND

A catalyst used in a fuel cell evenly loads a catalyst such as platinum (Pt) on a carbon support to improve the dispersibility, thereby being implemented to prevent clumping and express the high performance even with a small amount of catalyst.

The carbon support is surfaced-treated and has a wide specific surface area, and when the carbon support is in the raw material state without any treatment, there is a limit to putting the catalyst on the surface of the carbon support due to the small specific surface area.

In order to put a larger amount of catalyst on the surface of the carbon support, the specific surface area of the carbon support should be increased. For example, a method for forming pores in the surface of the carbon support and then loading the catalyst has been currently generally used.

However, in the related arts, a problem may be caused by a process of mixing the catalyst for the fuel cell having the catalyst loaded on the surface of the carbon support with the ionomer as described above to produce a slurry, when the electrode for the fuel cell is manufactured. Since the catalyst is in direct contact with the ionomer, the catalyst is covered by an ion exchanger such as a sulfonyl group of the ionomer.

As illustrated in FIG. 1, the catalyst may be classified into a catalyst 92 loaded on the surface of a support 91 and a catalyst 93 loaded in the pore of the support, in which the catalyst 92 loaded on the surface of the support 91 is poisoned by contacting an ionomer 94. Therefore, the performance of the fuel cell may not be implemented to the target level compared to an amount of catalyst loaded.

Moreover, the poisoning has been attempted by the ionomer by selectively loading the catalyst in only the internal pore of the support. However, it is not possible to completely form the catalyst in only the pore of the support due to the conventional chemical reduction process. Particularly, it is possible to increase the rate of the catalyst loaded in the pore of the support a little through the optimization of the reduction condition but in the chemical reduction, a seed is randomly formed on any surface in the precursor step and the particles of the catalyst are grown from the seed, such that it is very difficult to grow the particles of the catalyst only inside the pore of the support.

The above information disclosed in this Background section is only for enhancement of understanding of the background of the invention and accordingly it may include information that does not form the prior art that is already known in this country to a person of ordinary skill in the art.

SUMMARY

In preferred aspects, provided is a method for manufacturing a catalyst for a fuel cell having a structure capable of preventing the poisoning due to an ionomer.

The object of the present invention is not limited to the aforementioned object. The object of the present invention will be further apparent by the following description, and achieved by the means described in the claims and a combination thereof.

In an aspect, provided is a method for manufacturing a catalyst for a fuel cell, which may include: loading a catalyst on a support, coating a carbon layer on the surface of the support, removing at least a part of the carbon layer such that the catalyst is exposed, for example exposed to the outside. Suitably, the carbon layer is coated to provide a predetermined thickness on the support surface.

The catalyst may include one or more selected from the group consisting of platinum (Pt), ruthenium (Ru), tin (Sn), palladium (Pd), titanium (Ti), vanadium (V), chromium (Cr), manganese (Mn), iron (Fe), cobalt (Co), nickel (Ni), copper (Cu), zinc (Zn), aluminum (Al), molybdenum (Mo), selenium (Se), tungsten (W), iridium (Ir), osmium (Os), rhodium (Rh), niobium (Nb), tantalum (Ta), zirconium (Zr), lead (Pb), gallium (Ga), an oxide thereof, a sulfide thereof, and a nitride thereof.

The manufacturing method may coat the carbon layer by providing a hydrocarbon gas to the support on which the catalyst is loaded and heat-treating the same.

The heat treatment may be performed at a temperature of about 800° C. to 1,000° C.

The manufacturing method may coat the carbon layer by coating an organic ligand on the support on which the catalyst is loaded, and then heat-treating the same.

The organic ligand may include one or more selected from a group consisting of RCOOH, RCOOR, $RNH_2$, $R_2NH$, and $R_3N$, wherein each R independently is a substituted or unsubstituted aliphatic hydrocarbon group of C3 to C40.

The carbon layer may have a density less than a density of the support.

Preferably, a thickness of the carbon layer may be twice or three times greater than a particle size of the catalyst.

The carbon layer may be removed by vapor or alkaline compounds.

A remaining carbon layer may include pores having a predetermined width, and the catalyst may be exposed to the outside by locating the catalyst in the pores.

Preferably, a thickness of the remaining carbon layer may be greater than a particle size of the catalyst.

In an aspect, provided is a method for manufacturing an electrode for a fuel cell, which may include: preparing a slurry including the catalyst as described herein and an ionomer, and forming an electrode by applying the slurry to a substrate.

For the catalyst for the fuel cell according to various exemplary embodiments of the present invention, the catalyst and the ionomer may not be in direct contact with each other, thereby preventing the catalyst from being poisoned by the ionomer.

For the catalyst for the fuel cell according to various exemplary embodiments of the present invention, the catalyst may not be poisoned by the ionomer, thereby preventing the performance of the fuel cell from being lowered when the electrode is manufactured using the catalyst for the fuel cell.

The effect of the present invention is not limited to the aforementioned effects. It should be understood that the effect of the present invention includes all inferable effects in the following description.

The above and other features of the invention are discussed infra.

BRIEF DESCRIPTION OF THE DRAWINGS

The above and other features of the present invention will now be described in detail with reference to certain exemplary examples thereof illustrated in the accompanying drawings which are given herein below by way of illustration only, and thus are not limitative of the present invention, and wherein:

FIG. 5A illustrates the support and the catalyst before forming the coating layer, FIG. 5B illustrates the state where a part of the coating layer is formed, and FIG. 5C illustrates the state where the coating layer is entirely formed.

Figure 1:
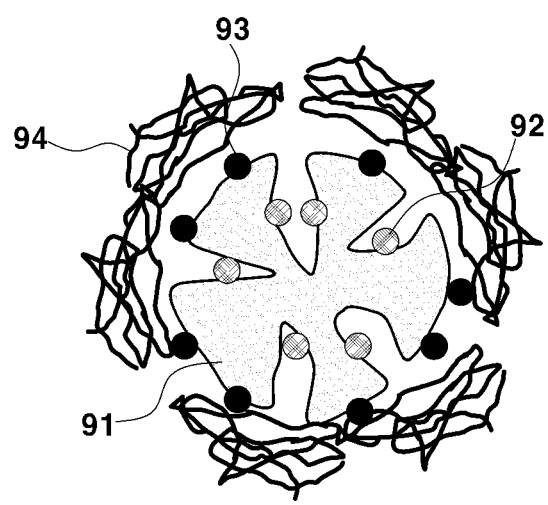
FIG. 1 is a reference diagram for explaining that a conventional catalyst is poisoned by an ionomer.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in section by the particular intended application and use environment.

In the figures, reference numbers refer to the same or equivalent sections of the present invention throughout the several figures of the drawing.

DETAILED DESCRIPTION

As described above, objects, other objects, features, and advantages according to the present invention will be readily understood through the following preferred exemplary embodiments with reference to the accompanying drawings. However, the present invention is not limited to the exemplary embodiments described herein and may also be embodied in other forms. Rather, the exemplary embodiments introduced herein are provided so that the invention may be made thorough and complete, and the spirit according to the present invention may be sufficiently conveyed to those skilled in the art.

Similar reference numerals are used for similar components while describing each drawing. In the accompanying drawings, the dimensions of the structures are illustrated to be enlarged than the actual one for clarity of the present invention. The terms of a first, a second, and the like may be used for describing various components, but the components should not be limited to the terms. The terms are used only for the purpose of distinguishing one component from another component. For example, a first component may be named as a second component, and similarly, the second component may be named as the first component without departing from the scope of the present invention. A singular expression includes a plural expression unless clearly otherwise expressed in the context.

In the present specification, it should be understood that terms such as "comprise" or "have" are intended to indicate that there is a feature, a number, a step, an operation, a component, a part, or a combination thereof described on the specification, and do not exclude the possibility of the presence or the addition of one or more other features, numbers, steps, operations, components, parts, or combinations thereof in advance. Further, when a portion such as a layer, a film, an area, or a plate is said to be "on" another portion, this includes not only the case where the portion is "directly above" another portion but also the case where other portions are interposed therebetween. Conversely, when a portion such as a layer, a film, an area, or a plate is said to be "under" another portion, this includes not only the case where the portion is "directly under" another portion but also the case where other portions are interposed therebetween.

Unless otherwise indicated, all numbers, values, and/or expressions referring to quantities of ingredients, reaction conditions, polymer compositions, and combinations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, where a numerical range is disclosed herein, such a range is continuous, and includes unless otherwise indicated, every value from the minimum value to and including the maximum value of such range. Still further, where such a range refers to integers, unless otherwise indicated, every integer from the minimum value to and including the maximum value is included. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

Figure 2:
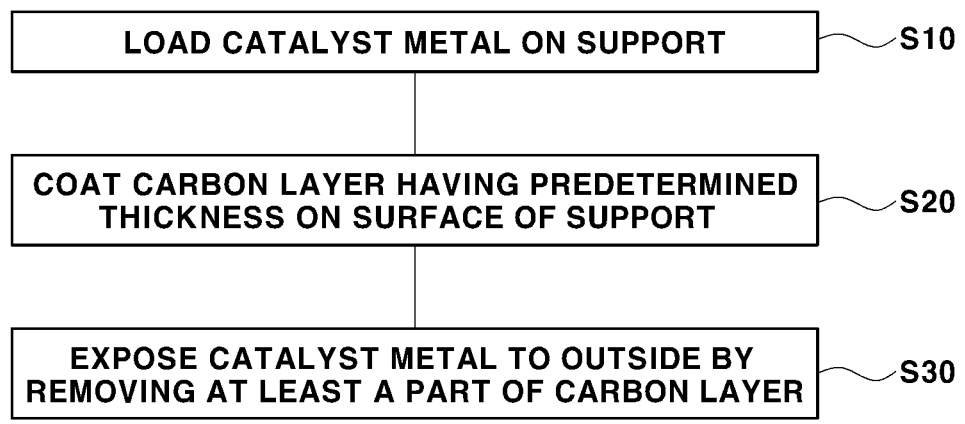
FIG. 2 is a flowchart illustrating a method for manufacturing a catalyst for a fuel cell according to the present invention.

FIG. 2 shows an exemplary method for manufacturing a catalyst for a fuel cell according to an exemplary embodiment of the present invention. As shown in FIG. 2, the manufacturing method may include loading a catalyst on a support (S10), coating a carbon layer having a pre-determined thickness on the surface of the support (S20), and exposing the catalyst to the outside by removing at least a part of the carbon layer (S30).

Figure 3:
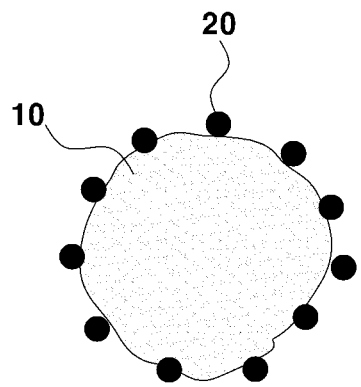
FIG. 3 is a diagram illustrating a support on which a catalyst according to the present invention is loaded.

FIG. 3 shows an exemplary support 10 on which a catalyst 20 is loaded.

The support 10 may include a carbon-based support or a metal oxide-based support.

The carbon-based support is not specially limited, but for example, may include one or more selected from the group consisting of a carbon black, a carbon nanotube (CNT), a graphite, a graphene, a graphite nanofiber (GNF), a fullerene, and a combination thereof.

The metal oxide-based support is not specially limited, but for example, may include one or more selected from a group consisting of a titanium-based oxide, a niobium-based oxide, a tin-based oxide, a zinc-based oxide, and a cerium-based oxide.

Preferably, the a carbon layer to be described late may include the same material, e.g., carbon-based material for the support 10.

The diameter of the support 10 is not specially limited, but for example, may be about 25 nm to 200 nm.

The catalyst 20 may include one or more selected from the group consisting of platinum (Pt), ruthenium (Ru), tin (Sn), palladium (Pd), titanium (Ti), vanadium (V), chromium (Cr), manganese (Mn), iron (Fe), cobalt (Co), nickel (Ni), copper (Cu), zinc (Zn), aluminum (Al), molybdenum (Mo), selenium (Se), tungsten (W), iridium (Ir), osmium (Os), rhodium (Rh), niobium (Nb), tantalum (Ta), zirconium (Zr), lead (Pb), an oxide thereof, a sulfide thereof, and a nitride thereof.

The method for loading the catalyst 20 on the support 10 is not specially limited, and for example, may mix the precursor of the catalyst 20 with the support 10 and then reduces the precursor to load the catalyst 20 on the support 10 as illustrated in FIG. 3.

Figure 4:
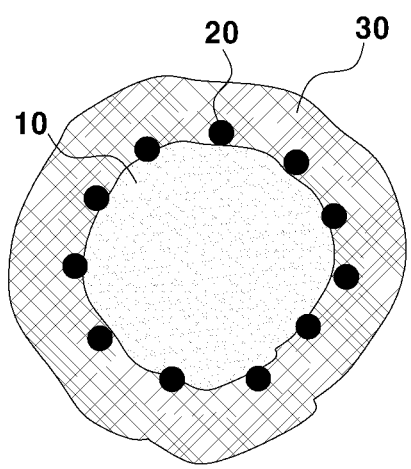
FIG. 4 is a diagram illustrating the result in which a carbon layer is coated on the surface of the support on which the catalyst according to the present invention is loaded.

FIG. 4 shows the result in which a carbon layer 30 is coated on the surface of the support 10 on which the catalyst 20 is loaded.

The carbon layer 30 may be coated on the surface of the support 10 at the thickness of the level capable of covering the catalyst 20.

The carbon layer 30 may be coated to cover the area of about 80% or greater, about 90% or greater, about 99% or greater, or 100% of the surface of the support 10.

The carbon layer 30 may be formed by providing the hydrocarbon to the support 10 on which the catalyst 20 is loaded and heat-treating the support 10 provided with the hydrocarbon at the high temperature. Specifically, the carbon layer 30 may be formed on the support 10 by putting the support 10 on which the catalyst 20 is loaded into a chamber capable of enduring the high temperature and the high pressure, supplying the hydrocarbon gas to the chamber, and then carbonizing the hydrocarbon gas through the high-temperature treatment.

The hydrocarbon gas is not specially limited, and for example, the gas consisting of only carbon, such as a methane, an ethane, a propane, or a butane, and hydrogen may be used as the hydrocarbon gas.

The heat treatment may be performed at the temperature of about 800° C. to 1,000° C., or about 900° C. to 1,000° C. The thickness of the carbon layer 30 may increase in direct proportion to the time of the heat treatment. Therefore, the heat treatment may be performed for an appropriate time such that the carbon layer 30 may sufficiently cover the surface of the support 10.

Meanwhile, the carbon layer 30 may also be formed by coating an organic ligand on the support 10 on which the catalyst 20 is loaded, and performing the heat treatment. Particularly, the carbon layer 30 may be formed on the support 10 by evenly mixing the support 10 on which the catalyst 20 is loaded with the organic ligand and then applying the heat thereto to carbonize the organic ligand.

The organic ligand may include one or more selected from a group consisting of RCOOH, RCOOR, $RNH_2$, $R_2NH$, and $R_3N$. Each R independently is a substituted or unsubstituted aliphatic hydrocarbon group of C3 to C40.

The heat treatment may be appropriately adjusted according to the type of organic ligand used. The carbon layer 30 may be formed by performing the heat treatment at the temperature of the temperature or more at which the selected organic ligand is carbonized.

The carbon layer 30 formed by the aforementioned method may have a density less than a density of the support. When the additional heat treatment is not performed for the carbon layer 30, the pores may be easily generated because the carbon layer 30 has the density less than that of the support 10. Therefore, in a process of removing at least a part of the carbon layer 30 to be described later, the support 10 is not removed, and only the carbon layer 30 may be selectively removed.

Figure 5A:
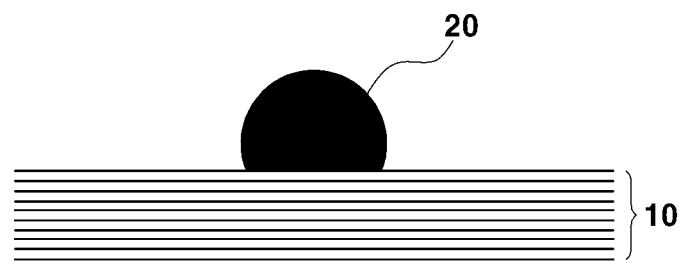
FIGS. 5A to 5C are reference diagrams for explaining a process of forming a coating layer on the support and the catalyst.
Figure 5B:
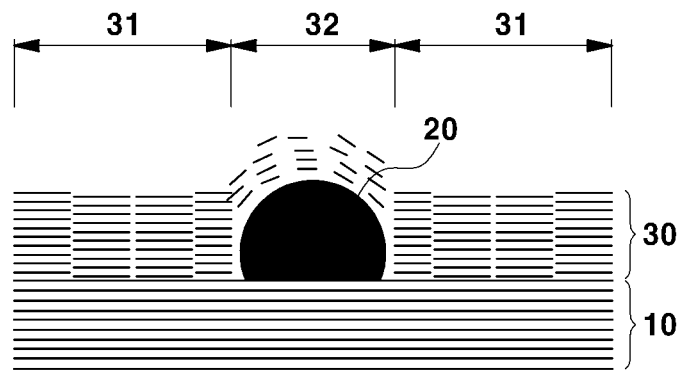
Figure 5C:
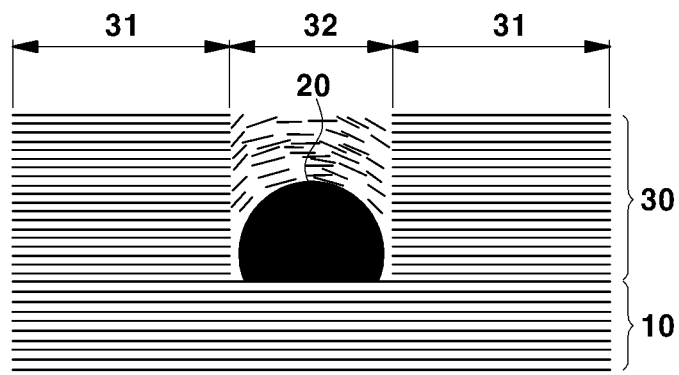

FIGS. 5A to 5C show exemplary process of forming the coating layer 30 on the support 10 and the catalyst 20. In particular, FIG. 5A shows the support 10 and the catalyst 20 before forming the coating layer 30, FIG. 5B shows the state where a part of the coating layer 30 is formed, and FIG. 5C shows the state where the coating layer 30 is entirely formed.

As shown in FIGS. 5B and 5C, the coating layer 30 may include a first region 31 formed on the support 10 and a second region 32 formed on the catalyst 20.

The first region 31 may be formed by the epitaxial growth of carbon. For example, the first region 31 may be formed by growing carbon in the same crystallization direction as the crystallization direction of the support 10.

On the other hand, the second region 32 may be formed by growing carbon in the direction different from that of the support 10 and the first region 31. In particular, the second region 32 may be formed by growing carbon in the random direction. Therefore, the second region 32 may have a coarser structure and a density less than densities of the support 10 and the first region 31.

Therefore, in the process of removing at least a part of the carbon layer 30 to be described later, the catalyst 20 may be exposed to the outside by selectively removing only the second region 32. The thickness of the carbon layer 30 may be twice or three times of the particle size of the catalyst 20. When the thickness of the carbon layer 30 is less than twice of the particle size of the catalyst 20, it is difficult to implement the poisoning prevention effect due to the ionomer, and when the thickness of the carbon layer 30 greater than three times, the material delivery resistance may be increased, thereby lowering the performance of the catalyst.

Figure 6:
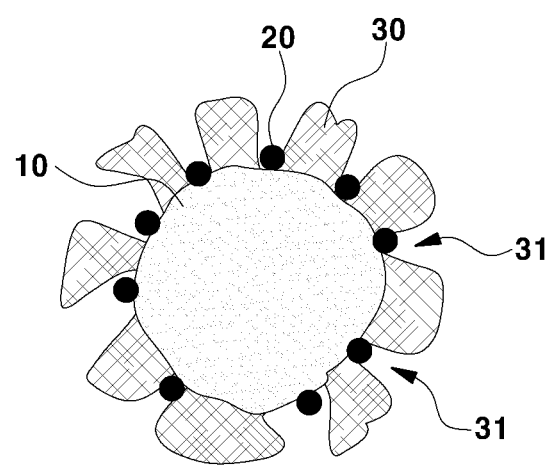
FIG. 6 is a diagram illustrating the catalyst of the state where the catalyst is exposed to the outside by removing at least a part of the carbon layer illustrated in FIG. 4.

FIG. 6 shows the catalyst in the state where the catalyst 20 is exposed to the outside by removing at least a part of the carbon layer 30.

The carbon layer 30 may be removed by being treated by vapor or alkaline compounds. In particular, pores may be formed in the carbon layer 30 by corroding the carbon layer 30 using the vapor or the alkaline compounds at the high temperature.

The corrosion by the vapor occurs as a whole and is not deep whereas the corrosion by the alkaline compounds locally deeply occurs, such that it is preferable to use the alkaline compounds.

The alkaline compounds may include one or more selected from of a sodium hydroxide (NaOH), and a potassium hydroxide (KOH).

As shown in FIG. 6, when at least a part of the carbon layer 30 is removed by being treated by the vapor or the alkaline compounds, pores 31 are formed. The catalyst 20 may be exposed to the outside by locating the catalyst 20 in the pores 31.

As described above, the treatment for the carbon layer 30 may be performed until the catalyst 20 is exposed to the outside. By removing at least a part of the carbon layer 30 at the depth of the level at which the catalyst 20 is to be exposed to the outside, the remaining carbon layer 30 prevents the direct contact between the catalyst 20 and the ionomer while minimizing the resistance of the material delivery, thereby preventing the poisoning due to the ionomer. Therefore, the thickness of the remaining carbon layer 30 is characterized by being larger than the particle size of the catalyst 20.

A method for manufacturing an electrode for the fuel cell may include preparing a slurry by mixing the catalyst obtained by the aforementioned method with the ionomer and forming an electrode by applying the slurry to a substrate.

The ionomer is not specially limited, but for example, may include one or more polymer selected from the group consisting of a perfluorosulfonic acid-based polymer, a hydrocarbon-based polymer, an aromatic sulfone-based polymer, an aromatic ketone-based polymer, a polybenzimidazole-based polymer, a polystyrene-based polymer, a polyester-based polymer, a polyimide-based polymer, a polyvinylidene fluoride-based polymer, a polyethersulfone-based polymer, a polyphenylene sulfide-based polymer, a polyphenylene oxide-based polymer, a polyphosphagen-based polymer, a polyethylene naphthalate-based polymer, a polyester-based polymer, a doped polybenzimidazole-based polymer, a polyetherketone-based polymer, a polyetheretherketone-based polymer, a polyphenylquinoxaline-based polymer, a polysulfone-based polymer, a polypyrrole-based polymer, and a polyaniline-based polymers.

Figure 7:
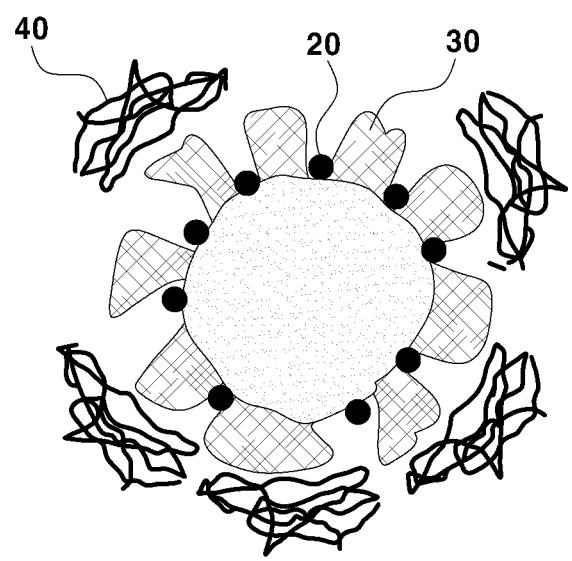
FIG. 7 is a reference diagram for explaining that the ionomer and the catalyst are not in direct contact with each other by the carbon layer within the electrode for the fuel cell according to the present invention.

FIG. 7 shows that the ionomer 40 and the catalyst 20 are not in direct contact with each other by the carbon layer 30 within the electrode. As shown in FIG. 7, the catalyst 20 is not poisoned by the ionomer 40, thereby not lowering the performance of the catalyst and the electrode including the same.

As described above, the experimental example and the exemplary embodiment of the present invention have been described in detail, and the scope of the present invention is not limited to the aforementioned experimental example and exemplary embodiment, and various modified and improved forms by those skilled in the art using the basic concept of the present invention defined by the appended claims are also included in the scope of the present invention.

What is claimed is:

1. A method for manufacturing an electrode for a fuel cell, comprising:
    loading a catalyst metal on a support;
    coating a carbon layer on a surface of the support such that the carbon layer comprises a first region on the support and a second region on the catalyst metal, wherein the first region is formed by growing carbon in the same crystallization direction as the support, and the second region is formed by growing carbon in a random direction;
    selectively removing at least the second region of the carbon layer prior to contacting the catalyst with an ionomer, thereby exposing the catalyst metal while leaving the first region of the carbon layer on the support, thus forming a catalyst;
    preparing a slurry by mixing the catalyst with an ionomer; and
    forming an electrode by applying the slurry to a substrate,
    wherein the carbon layer is coated by providing a hydrocarbon gas to the support on which the catalyst metal is loaded and heat-treating the same.

2. The method of claim 1 wherein the carbon layer is coated to provide a predetermined thickness on the support surface.

3. The method of claim 1,
    wherein the catalyst metal comprises one or more selected from the group consisting of platinum (Pt), ruthenium (Ru), tin (Sn), palladium (Pd), titanium (Ti), vanadium (V), chromium (Cr), manganese (Mn), iron (Fe), cobalt (Co), nickel (Ni), copper (Cu), zinc (Zn), aluminum (Al), molybdenum (Mo), selenium (Se), tungsten (W), iridium (Ir), osmium (Os), rhodium (Rh), niobium (Nb), tantalum (Ta), zirconium (Zr), lead (Pb), gallium (Ga), an oxide thereof, a sulfide thereof, and a nitride thereof.

4. The method of claim 1,
    wherein the heat treatment is performed at a temperature of about 800° C. to 1,000° C.

5. The method of claim 1, wherein the carbon layer has a density less than a density of the support.

6. The method of claim 1,
    wherein a thickness of the carbon layer is twice or three times greater than a particle size of the catalyst.

7. The method of claim 1,
    wherein the carbon layer is treated and removed by vapor or alkaline compounds.

8. The method of claim 1,
    wherein a remaining carbon layer comprises pores having a pre-determined width, and the catalyst metal is exposed to the outside by locating the catalyst in the pores.

9. The method of claim 1,
    wherein a thickness of a remaining carbon layer is greater than a particle size of the catalyst.

10. A method for manufacturing an electrode for a fuel cell, comprising:
    loading a catalyst metal on a support;
    coating a carbon layer on a surface of the support such that the carbon layer comprises a first region on the support and a second region on the catalyst metal, wherein the first region is formed by growing carbon in the same crystallization direction as the support, and the second region is formed by growing carbon in a random direction; and selectively removing at least the second region of the carbon layer prior to contacting the catalyst with an ionomer, thereby exposing the catalyst metal while leaving the first region of the carbon layer on the support, thus forming a catalyst preparing a slurry by mixing the catalyst with an ionomer, and forming an electrode by applying the slurry to a substrate, wherein the carbon layer is coated by coating an organic ligand on the support on which the catalyst metal is loaded, and then heat-treating the same.

11. The method of claim 10,
wherein the organic ligand comprises one or more selected from the group consisting of RCOOH, RCOOR, $RNH_2$, $R_2NH$, and $R_3N$, wherein each R is independently a substituted or unsubstituted aliphatic hydrocarbon group of C3 to C40.

12. A method for manufacturing an electrode for a fuel cell, comprising:

loading a catalyst metal on a support;

coating a carbon layer on a surface of the support such that the carbon layer comprises a first region on the support and a second region on the catalyst metal, wherein the first region is formed by growing carbon in the same crystallization direction as the support, and the second region is formed by growing carbon in a random direction; and selectively removing at least the second region of the carbon layer prior to contacting the catalyst with an ionomer, thereby exposing the catalyst metal while leaving the first region of the carbon layer on the support, thus forming a catalyst;

preparing a slurry by mixing the catalyst with an ionomer comprising the catalyst and an ionomer, and forming an electrode by applying the slurry to a substrate, wherein the carbon layer is treated by vapor or alkaline compounds so that the second region of the carbon layer is selectively removed.

* * * * *